United States Patent
Doore et al.

(10) Patent No.: US 11,016,513 B2
(45) Date of Patent: May 25, 2021

(54) METHOD OF MIXING AT LEAST TWO GASES

(71) Applicant: Airgas, Inc., Radnor, PA (US)

(72) Inventors: Mark Joseph Doore, Perrysburg, OH (US); Bradley Wallace, Holland, MI (US); Gregory Caniglia, Brecksville, OH (US)

(73) Assignee: Airgas, Inc., Radnor, PA (US)

( * ) Notice: Subject to any disclaimer, the term of this patent is extended or adjusted under 35 U.S.C. 154(b) by 399 days.

(21) Appl. No.: 15/783,754

(22) Filed: Oct. 13, 2017

(65) Prior Publication Data
US 2018/0239374 A1 Aug. 23, 2018

Related U.S. Application Data

(60) Provisional application No. 62/462,441, filed on Feb. 23, 2017.

(51) Int. Cl.
*G05D 7/06* (2006.01)
*G01F 7/00* (2006.01)
(Continued)

(52) U.S. Cl.
CPC ............ *G05D 7/0658* (2013.01); *G01F 7/00* (2013.01); *G05D 7/0641* (2013.01);
(Continued)

(58) Field of Classification Search
CPC .... B01J 2208/00008; B01J 2208/00035; B01J 2208/00061; B01J 19/0006; B01J 7/00;
(Continued)

(56) References Cited

U.S. PATENT DOCUMENTS

2007/0125374 A1   6/2007  Smith et al.
2013/0340753 A1*  12/2013  Weiszl ................. A61M 16/12
                                                    128/203.14

FOREIGN PATENT DOCUMENTS

EP         2 489 392         8/2012
GB         2 176 313         12/1986
WO    WO 2010 101812         9/2010

OTHER PUBLICATIONS

Partial International Search Report and Written Opinion for corresponding PCT/US2018/019327, dated Jun. 28, 2018.
(Continued)

*Primary Examiner* — Dean Kwak
(74) *Attorney, Agent, or Firm* — Elwood L. Haynes

(57) ABSTRACT

A method of mixing at least two gases is provided. This method includes providing a mixture composition control, including a predetermined composition input and a composition trim input. Providing N gas flow meters, including a N gas flows, and N desired gas flow rates determined by the mixture composition control, wherein N is 3 or more. Mixing the N gas flows, thereby producing a mixed gas flow at the predetermined composition and at a line pressure. Configuring the N flow meters to adjust the N gas flows to maintain the line pressure at a predetermined value, while maintaining the predetermined composition. And adjusting the composition trim input to vary the composition of the mixed gas, without modifying the predetermined composition input.

2 Claims, 5 Drawing Sheets

(51) Int. Cl.
*G05D 11/13* (2006.01)
*G05D 16/20* (2006.01)
*G05B 15/02* (2006.01)

(52) U.S. Cl.
CPC ......... *G05D 11/132* (2013.01); *G05D 11/133* (2013.01); *G05D 11/139* (2013.01); *G05D 16/2026* (2013.01); *G05D 16/2046* (2013.01); *G05B 15/02* (2013.01)

(58) Field of Classification Search
CPC .... B01J 8/0292; C21B 2300/04; G07F 13/06; G01N 21/3504; G01N 33/0004; Y10T 477/75; G05D 11/132; G05D 11/133; G05D 11/139; G05D 16/2026; G05D 16/2046; G05D 7/0641; G05D 7/0658; F23N 2037/08
USPC ...................... 700/239, 266; 702/24; 436/55; 435/286.1, 286.7
See application file for complete search history.

(56) References Cited

OTHER PUBLICATIONS

International Search Report and Written Opinion for related PCT/US2018/019319, dated Jun. 4, 2018.
International Search Report and Written Opinion for related PCT/US2018/019333, dated Jun. 25, 2018.

* cited by examiner

METHOD OF MIXING AT LEAST TWO GASES

CROSS REFERENCE TO RELATED APPLICATIONS

This application claims the benefit of priority under 35 U.S.C. § 119 (a) and (b) and to U.S. Provisional Patent Application No. 62/462,441, filed Feb. 23, 2017, the entire contents of which are incorporated herein by reference.

BACKGROUND

Gas blending is the process of mixing gases for a specific purpose where the composition of the resulting mixture is specified and controlled. A wide range of applications include scientific and industrial processes, food processing and/or packaging, and breathing gases. Examples include shielding gases for welding, modified atmosphere packing in the food industry, breathing gas mixtures for diving, medical gas mixtures, chemical production processes, and calibration gases. Reliable, repeatable, accurate, and precise mixing of the various constituent gases is very important.

SUMMARY

A method of mixing two gases is provided. The method includes providing a mixture composition control including a mixed gas flow at a predetermined composition. Providing a first gas flow meter, including a first gas flow, and a first desired gas flow rate determined by the mixture composition control. Providing a second flow meter, including a second gas flow, and a second desired gas flow rate determined by the mixture composition control. Mixing the first gas flow and the second gas flow, thereby producing the mixed gas flow at the predetermined composition and at a line pressure. And configuring the first flow meter and the second flow meter to adjust the first gas flow and second gas flow to maintain the line pressure at a predetermined value, while maintaining the predetermined composition.

Another method of mixing at least two gases is provided. This method includes providing a mixture composition control including a mixed gas flow at a predetermined composition. Providing N gas flow meter, including N gas flows, and N desired gas flow rate determined by the mixture composition control, wherein N is 3 or more. Mixing the N gas flows, thereby producing the mixed gas flow at the predetermined composition and at a line pressure. And configuring the N flow meters to adjust the N gas flows to maintain the line pressure at a predetermined value, while maintaining the predetermined composition.

This method includes providing a mixture composition control, including a predetermined composition input and a composition trim input. Providing a first gas flow meter, including a first gas flow, and a first desired gas flow rate determined by the mixture composition control. Providing a second flow meter, including a second gas flow, and a second desired gas flow rate determined by the mixture composition control. Mixing the first gas flow and the second gas flow, thereby producing a mixed gas with a predetermined composition. And adjusting the composition trim input to vary the composition of the mixed gas, without modifying the predetermined composition input.

Another method of mixing at least two gases is provided. This method includes providing a mixture composition control, including a predetermined composition input and a composition trim input. Providing N gas flow meters, including N gas flows, and N desired gas flow rates determined by the mixture composition control. Mixing the N gas flows, thereby producing a mixed gas with a predetermined composition. And adjusting the composition trim input to vary the composition of the mixed gas, without modifying the predetermined composition input.

Another method of mixing two gases is provided. This method includes providing a mixture composition control, including a predetermined composition input and a composition trim input. Providing a first gas flow meter, including a first gas flow, and a first desired gas flow rate determined by the mixture composition control. Providing a second flow meter, including a second gas flow, and a second desired gas flow rate determined by the mixture composition control. Mixing the first gas flow and the second gas flow, thereby producing a mixed gas flow at the predetermined composition and at a line pressure. Configuring the first flow meter and the second flow meter to adjust the first gas flow and second gas flow to maintain the line pressure at a predetermined value, while maintaining the predetermined composition. And adjusting the composition trim input to vary the composition of the mixed gas, without modifying the predetermined composition input.

Another method of mixing at least two gases is provided. This method includes providing a mixture composition control, including a predetermined composition input and a composition trim input. Providing N gas flow meters, including a N gas flows, and N desired gas flow rates determined by the mixture composition control, wherein N is 3 or more. Mixing the N gas flows, thereby producing a mixed gas flow at the predetermined composition and at a line pressure. Configuring the N flow meters to adjust the N gas flows to maintain the line pressure at a predetermined value, while maintaining the predetermined composition. And adjusting the composition trim input to vary the composition of the mixed gas, without modifying the predetermined composition input.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
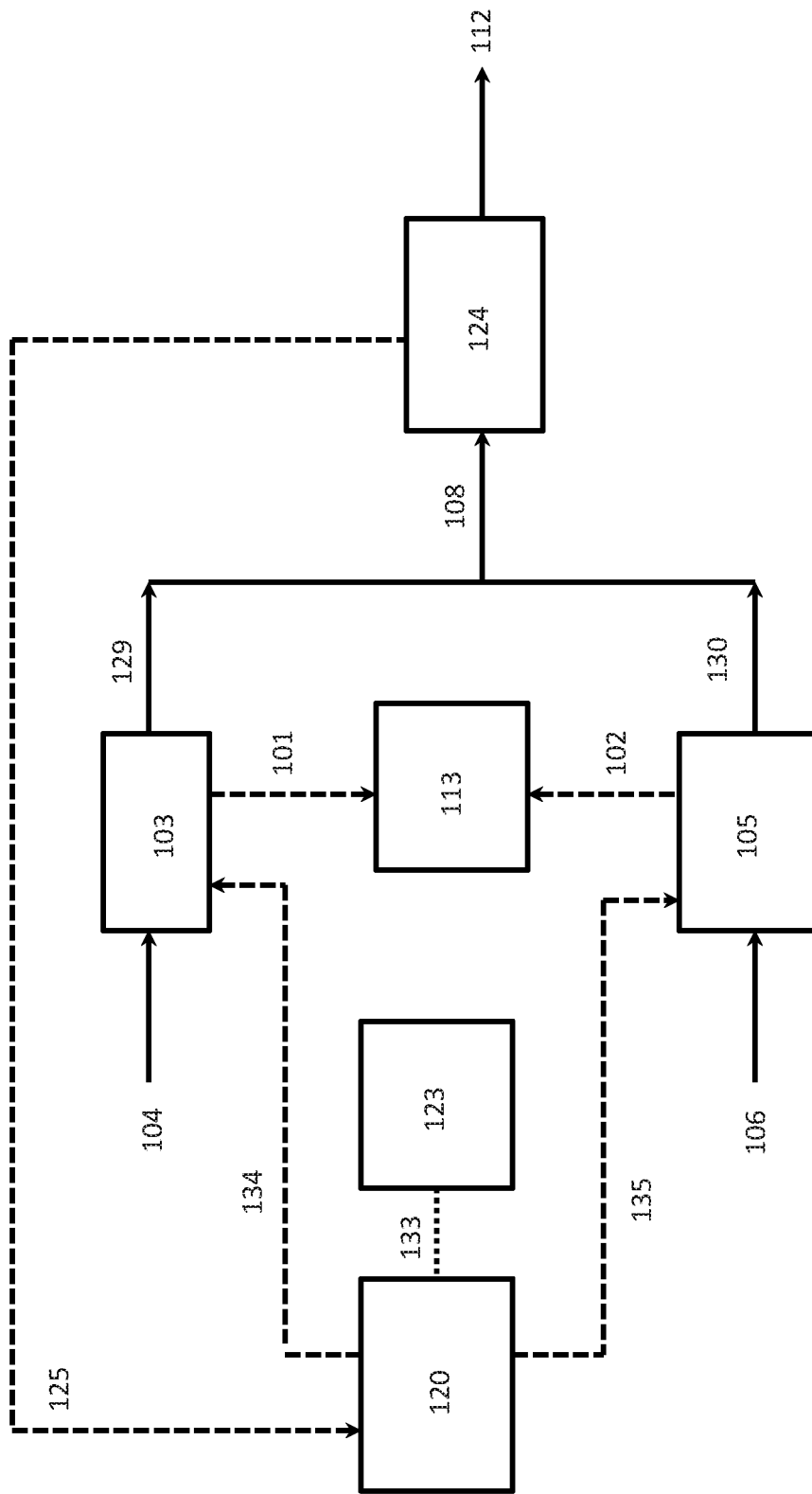
FIG. 1 is a schematic representation the method for mixing two gases, accordance with one embodiment of the present invention.

101=Signal from First Flow Meter to CTP Calculator
102=Signal from Second Flow Meter to CTP Calculator
103=First Flow Meter 104=First Gas (Inlet)
105=Second Flow Meter
106=Second Gas (Inlet)
107=Flow Sensor (internal to Flow Meters 102, 105, 113, and 116)
108=Combined Gas Flow
109=Alarm
110=Data Logging System
111=Industrial Input/Output
112=Mixed Gas Outlet
113=CTP Calculator
114=Third Flow Meter
115=Third Gas (Inlet)
116=Fourth Flow Meter
117=Fourth Gas (Inlet)
118=Signal from Third Flow Meter to CTP Calculator
119=Signal from Fourth Flow Meter to CTP Calculator
120=Mixture Composition Control
121=Imbedded Controller (internal to Flow Meters 102, 105, 113, and 116)
122=Control Valve (internal to Flow Meters 102, 105, 113, and 116)
123=Manual Set Point Trim Control
124=Pressure Sensor
125=Pressure Sensor Signal to First Flow Meter
126=Pressure Sensor Signal to Second Flow Meter
127=Pressure Sensor Signal to Third Flow Meter
128=Pressure Sensor Signal to Fourth Flow Meter
129=First Flow Meter Gas Outlet
130=Second Flow Meter Gas Outlet
131=Third Flow Meter Gas Outlet
132=Fourth Flow Meter Gas Outlet
133=Signal from Manual Set Point Control to Mixture Composition Control
134=Signal from Mixture Composition Control to First Flow Meter
135=Signal from Mixture Composition Control to Second Flow Meter
136=Signal from Mixture Composition Control to Third Flow Meter
137=Signal from Mixture Composition Control to Fourth Flow Meter
200=Combined Gas Flow (instantaneous)
300=Combined Gas Flow (cumulative)

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "instantaneous" is defined as performing a calculation as quickly as the flow rate measurements and the embedded controller permit, and with no calculation delay after the reception of the measurement.

As used herein, the term "cumulative" is defined as performing a calculation over predetermined, and extended, period of time, thereby determining an overall average value.

As used herein, the term "first interval of time" is defined as an interval of between about $1/60$th of a second to about $1/10$th of a second. This is the time required for the "instantaneous" (as defined herein) measurements and calculations to be performed.

As used herein, the term "second interval of time" is defined as an interval of between about 5 minutes and about 60 minutes. This is the time over which the "instantaneous" measurements and calculations are summed in order to calculate the "cumulative" (as defined herein) values. The "second interval of time may also be any duration for which the skilled artisan will find the results enlightening or useful As used herein, the term "calculated theoretical percentage" (CTP) of one component gas in a gas mixture is defined as ratio of the actual, measured flow rate of one of the component gases to the actual, measured total flow of all component gases in the mixture. This CTP may then be compared to the input ratio to determine the accuracy and/or precision of the mixer, and may be adjusted by the manual set point trim control.

As used herein, the term "instantaneous calculated theoretical percentage" of one component gas in a gas mixture is defined as the above described CTP calculation, with the calculation being performed as quickly as the flow rate measurements and the embedded controller permit (the first predetermined intervals of time) and with no calculation delay after the reception of the measurement.

As used herein, the term "cumulative calculated theoretical percentage" of one component gas in a gas mixture is defined as the above described CTP calculation, with the calculation being performed over a predetermined, and extended, period of time (the second predetermined interval of time), thereby determining an overall average CTP.

As used herein, the term "mixture composition control" is defined as a mechanism that allows an operator to input a desired gas mixture component percent composition, and which adjusts associated flow control devices, by means of feedback signals, to maintain the desired composition as operational conditions (pressure, total flow rate, etc.) varies. This value will typically be displayed on a control panel.

It should be noted that the "mixture composition control" is fundamentally different, and functionally separate, from the "calculated theoretical percentage". The "calculated theoretical percentage" uses feedback to make a calculation, but does not actively adjust any of the flow rates. In contrast, the "mixture composition control" uses feedback to actively adjust the flow rates as necessary to maintain the desired flow rate. Specifically, the "mixture composition control" is unconcerned with the total flow rate the actual mixed gas, but is only concerned with the flow rates of the individual flow meters. The "mixture composition control" modulates the flow rates of the individual flow meters in order to best achieve the input value.

As used herein, the term" composition trim input" is defined as a mechanism that allows an operator to provide real-time adjustments to a system that is operated by a mixture composition control, that will alter the output composition, without affecting the original desired gas mixture component percent composition input. This value will typically be displayed on a control panel.

Figure 3:
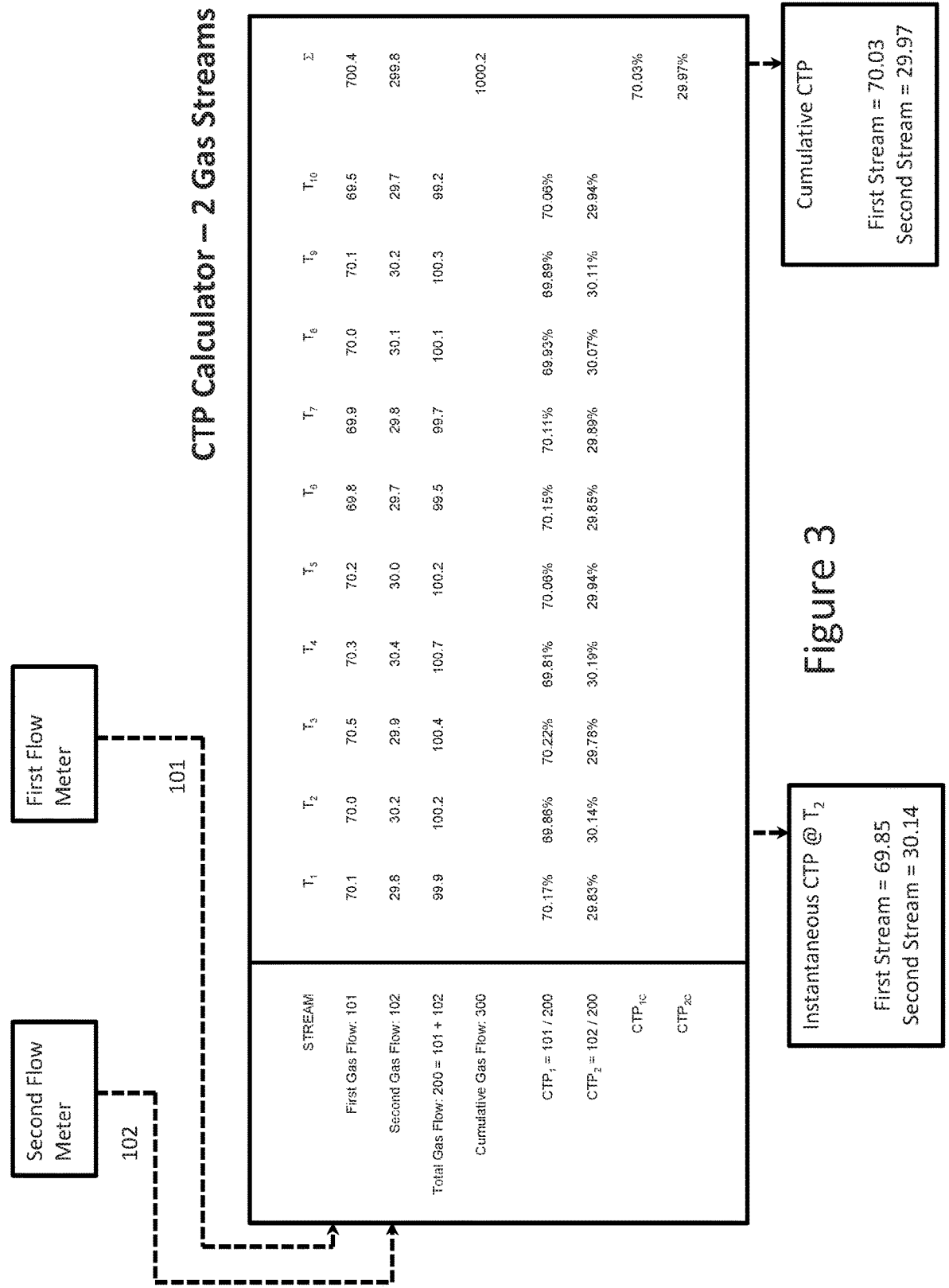
FIG. 3 is a schematic representation the method for determining the calculated theoretical percentage for two gases, in accordance with one embodiment of the present invention.

Turning to FIGS. 1 and 3, a method of mixing two gases and determining an instantaneous calculated theoretical percentage is presented. In one embodiment of this invention, the method of mixing includes first flow meter 103, second flow meter 105, and CTP calculator 113. A first gas stream 104 is provided to the inlet of first flow meter 103, which measures the flow rate of first gas stream 104 at a first predetermined interval of time and sends a signal 101 to the CTP calculator 113. A second gas stream 106 is provided to the inlet of second flow meter 105, which measures the flow rate of second gas stream 106 at the first predetermined interval of time and sends a signal 102 to the CTP calculator 113. The first predetermined interval of time may be between 1/60 of a second and 1/10 of a second.

After passing through the flow meters, the first gas 129 is combined with the second gas 130, to form the combined gas stream 108. The first measured gas flow 101 and the second measured gas flow 102 are added together, thereby determining the total instantaneous gas flow 200 at the predetermined intervals of time. The total gas flow may be less than 8000 scfh. The measured first gas flow 101 is divided by the total instantaneous gas flow 200, thereby determining an instantaneous calculated theoretical percentage $CTP_1$ for the first gas flow 101 at the first predetermined intervals of time.

The measured second gas flow 102 is divided by the total instantaneous gas flow 200, thereby determining an instantaneous calculated theoretical percentage $CTP_2$ for the second gas flow 102 at the first predetermined intervals of time. Either an alarm may be sounded, and/or the first gas flow and the second gas flow may be terminated, if either the instantaneous calculated theoretical percentage $CTP_1$ for the first gas flow 101 or the instantaneous calculated theoretical percentage $CTP_2$ for the second gas flow 102 exceeds a predetermined range value.

An embedded controller may be configured to measure the first gas flow 101 and second gas flow 102, calculate the total instantaneous gas flow 200, calculate the instantaneous theoretical percentage for the first gas flow $CTP_1$ and second gas flow $CTP_2$, and sound the alarm if the predetermined range value is exceeded. In this embodiment, no programmable logic controller is required. The embedded controller may be monitored by a data logging system. The embedded controller may interface with an output, allowing the user to access real time CTP calculations or historical CTP data. The embedded controller may include at least one industrial input/output. The first gas flow 101, the second gas flow 102, and/or the combined gas flow 200 may be used in food processing, Modified Atmospheric Packaging, welding, inerting, blanketing, beverage production, etc.

Again, with reference to FIGS. 1 and 3, a method of mixing two gases and determining cumulative calculated theoretical percentage is presented. In one embodiment of this invention, the method of mixing includes first flow meter 103, second flow meter 105, and CTP calculator 113. A first gas stream 104 is provided to the inlet of first flow meter 103, which measures the flow rate of first gas stream 104 at a first predetermined interval of time and sends a signal 101 to the CTP calculator 113. The measured first gas flow rate 101 is totaled over a first predetermined period of time. A second gas stream 106 is provided to the inlet of second flow meter 105, which measures the flow rate of second gas stream 106 at the first predetermined interval of time and sends a signal 102 to the CTP calculator 113. The measured second gas flow rate 102 is also totaled over a second predetermined period of time.

After passing through the flow meters, the first gas 129 is combined with the second gas 130, to form the combined gas stream 108. The first measured gas flow 101 and the second measured gas flow 102 are added together, thereby determining the instantaneous total gas flow 200 at the first predetermined intervals of time. The total first measured gas flow 101 and the total second measured gas flow 102 are added together, thereby determining the total cumulative gas flow 300 at the second predetermined interval of time. The total gas flow may be less than 8000 scfh.

The measured first gas flow 101 is divided by the total instantaneous gas flow 200, thereby determining an instantaneous calculated theoretical percentage $CTP_1$ for the first gas flow 101 at the first predetermined intervals of time. The measured second gas flow 102 is divided by the total instantaneous gas flow 200, thereby determining an instantaneous calculated theoretical percentage $CTP_2$ for the second gas flow 102 at the first predetermined intervals.

The measured first gas flow 101 is divided by the total continuous gas flow 300, thereby determining a calculated continuous theoretical percentage $CTP_{1C}$ for the first gas flow 101 at the second predetermined interval of time. The measured second gas flow 102 is divided by the total continuous gas flow 300, thereby determining a calculated cumulative theoretical percentage $CTP_{2C}$ for the second gas flow 102 at the second predetermined interval of time.

Either an alarm may be sounded, and/or the first gas flow and the second gas flow may be terminated, if the instantaneous calculated theoretical percentage CTP for either the first gas flow 101 or the second gas flow 102 exceeds a predetermined range value. Likewise, either an alarm may be sounded and/or either gas flow may be terminated if the cumulative calculated theoretical percentage CTP for either the first gas flow 101 or the second gas flow 102 exceeds a predetermined range value.

An embedded controller may be configured to measure the first gas flow 101 and second gas flow 102, calculate the total instantaneous gas flow 200, calculate the total cumulative gas flow 300, calculate the instantaneous theoretical percentage for the first gas flow $CTP_1$ and second gas flow $CTP_2$, calculate the cumulative theoretical percentage for the first gas flow $CTP_{1C}$ and second gas flow $CTP_{2C}$, and sound the alarm if the predetermined range value is exceeded. In this embodiment, no programmable logic controller is required. The embedded controller may be monitored by a data logging system. The embedded controller may include at least one industrial input/output. The first gas flow 101, the second gas flow 102, and/or the combined gas flow 200 may be used in food processing, Modified Atmospheric Packaging, welding, inerting, blanketing, beverage production, etc.

The above described, non-limiting embodiments of the present invention describe the mixing of two gases and the calculation of instantaneous CTP and cumulative CTP for each of the two streams. This method may be extended to N gas streams.

Figure 2:
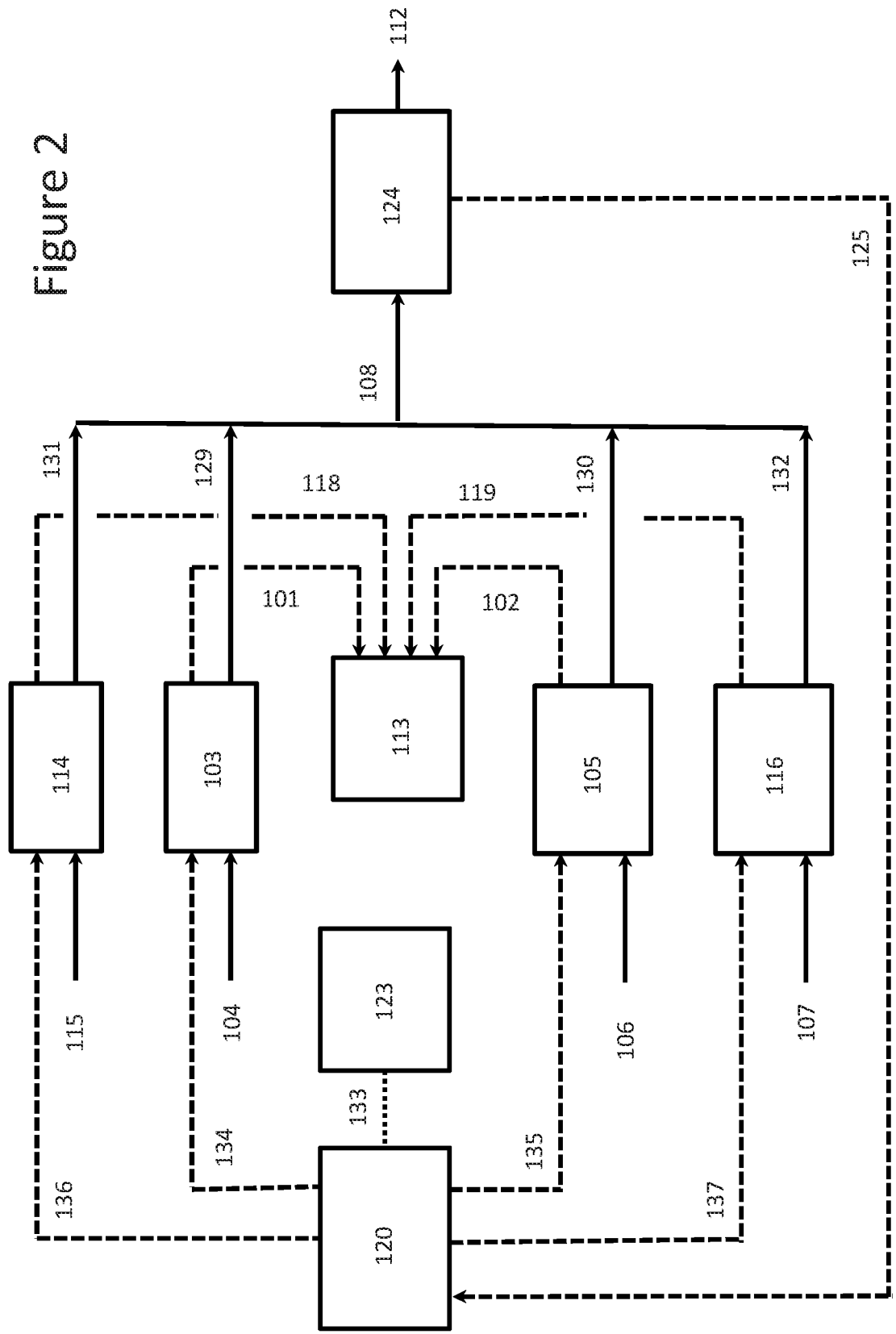
FIG. 2 is a schematic representation the method for mixing N gases, accordance with one embodiment of the present invention.
Figure 4:
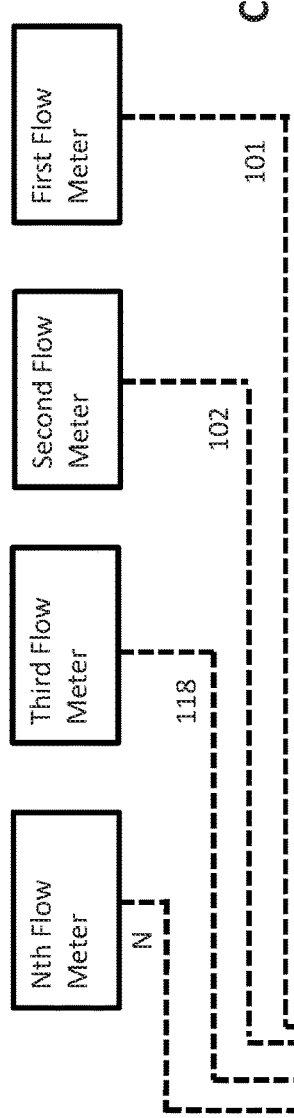
FIG. 4 is a schematic representation the calculated theoretical percentage calculator for N gases, in accordance with one embodiment of the present invention.
Figure 5:
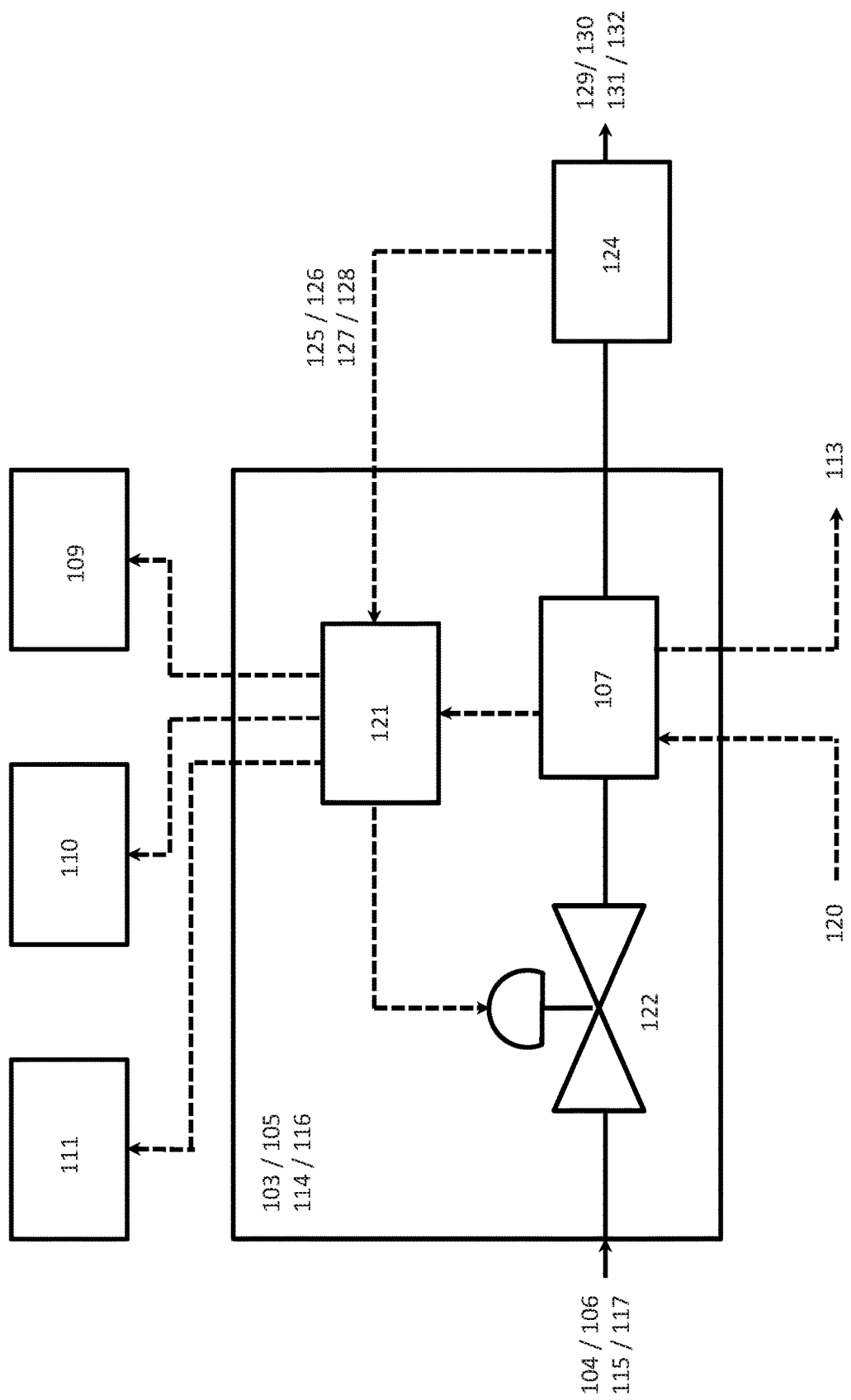
FIG. 5 is a representative representation of the flow mixers, in accordance with one embodiment of the present invention.

Turning now to FIGS. 2 and 4, a method of mixing N gases and determining an instantaneous calculated theoretical percentage is presented. In one embodiment of this invention, the method of mixing includes N flow meters 103, 105, 114, 116, and CTP calculator 113. In the following, a system with 4 flow meters is discussed, however there need not be an even number of flow meters. The logic and method may be applied to any number of flow meters.

N gas streams 104, 106, 107, 115 are provided to the inlet of the N flow meters 103, 105, 114, 116, which measures the flow rate of each of the N gas streams at a first predetermined interval of time and sends a signal 101, 102, 118, 119 to the CTP calculator 113.

After passing through the N flow meters 103, 105, 114, 116, the N gas streams 104, 106, 107, 115 are combined to form the combined gas stream 108. The N measured gas flows 101, 102, 118, 119 are added together, thereby determining the total instantaneous gas flow 200 at the predetermined intervals of time. The total gas flow may be less than 8000 scfh. The measured first gas flow of each stream 101, 102, 118, 119 are divided by the total instantaneous gas flow 200, thereby determining an instantaneous calculated theoretical percentage $CTP_N$ for each gas stream at the first predetermined intervals of time.

Either an alarm may be sounded, and/or one or more of the N gas flows may be terminated, if either the instantaneous calculated theoretical percentage $CTP_N$ for that gas flow 101 exceeds a predetermined range value.

An embedded controller may be configured to measure the N gas flows, calculate the total instantaneous gas flow 200, calculate the instantaneous theoretical percentage for each of the N gas flows, and sound the alarm if the predetermined range value is exceeded by any of the N gas flows. In this embodiment, no programmable logic controller is required. The embedded controller may be monitored by a data logging system. The embedded controller may interface with an output, allowing the user to access real time CTP calculations or historical CTP data. The embedded controller may include at least one industrial input/output. One or more of the N gas flows and/or the combined gas flow 200 may be used in food processing, Modified Atmospheric Packaging, welding, inerting, blanketing, beverage production, etc.

Again, with reference to FIGS. 2 and 4, a method of mixing N gases and determining cumulative calculated theoretical percentage is presented. In one embodiment of this invention, the method of mixing includes N flow meter 103, 105, 114, 116, and CTP calculator 113. In the following, a system with 4 flow meters is discussed, however there need not be an even number of flow meters. The logic and method may be applied to any number of flow meters.

N gas streams 104, 106, 107, 115 are provided to the inlet of the N flow meters 103, 105, 114, 116, which measures the flow rate of each of the N gas streams at a first predetermined interval of time and sends a signal 101, 102, 118, 119 to the CTP calculator 113. The measured flow rate for each of the N gases is totaled over a second predetermined period of time.

The N measured gas flows 101, 102, 118, 119 are added together, thereby determining the total instantaneous gas flow 200 at the predetermined intervals of time. The total measured gas flows for each of the N gases are added together, thereby determining the total cumulative gas flow 300 at the second predetermined interval of time for each of the N gas flows. The total gas flow may be less than 8000 scfh.

The measured first gas flow of each stream 101, 102, 118, 119 are divided by the total instantaneous gas flow 200, thereby determining an instantaneous calculated theoretical percentage $CTP_N$ for each gas stream at the first predetermined intervals of time. The measured gas flow for each of the N streams is divided by the total continuous gas flow 300, thereby determining a calculated continuous theoretical percentage $CTP_{NC}$ for the each of the gas flows at the second predetermined interval of time.

Either an alarm may be sounded, and/or one or more of the N gas flows may be terminated, if either the cumulative calculated theoretical percentage $CTP_N$ for that gas flow exceeds a predetermined range value.

An embedded controller may be configured to measure the N gas flows, calculate the total instantaneous gas flow 200, calculate the instantaneous theoretical percentage for each of the N gas flows, and sound the alarm if the predetermined range value is exceeded by any of the N gas flows, calculate the cumulative theoretical percentage for each of the N gas flows $CTP_{NC}$, and sound the alarm if the predetermined range value is exceeded. In this embodiment, no programmable logic controller is required. The embedded controller may be monitored by a data logging system. The embedded controller may include at least one industrial input/output. One or more of the N gas flows and/or the combined gas flow 200 may be used in food processing, Modified Atmospheric Packaging, welding, inerting, blanketing, beverage production, etc.

Turning back to FIGS. 1 and 3, a method of mixing two gases and flow matching is presented. In one embodiment of this invention, the method includes a first gas flow meter 103, a second gas flow meter 105, a pressure sensor 124, and a mixture composition control 120, which allows a mixed gas flow to be formed at a predetermined composition $C_1$.

A first gas flow 104 enters the first gas flow meter 103, and a first desired gas flow rate $F_1$ is determined by the mixture composition control 120. A second gas flow 106 enters the second gas flow meter 105, and a second desired gas flow rate $F_2$ is determined by the mixture composition control 120. The first gas 129 and the second gas 130 are mixed, thereby producing a mixed gas flow 108 at the predetermined composition $C_1$ and at a line pressure $P_L$, with a total gas flow $F_T$. The total gas flow $F_T$ may be less than 8000 scfh.

The pressure sensor 124 provides a pressure signal 125 to the mixture composition control 120, which adjusts the flow commands to the flow meters as necessary to maintain a predetermined line pressure $P_L$. Simultaneously, the mixture composition control 120 provides a signal 134 to the first gas flow meter and a signal 135 the second gas flow meter, allowing the flow meters to adjust as necessary to maintain the predetermined composition $C_1$.

The above described, non-limiting embodiments of the present invention describe the mixing of two gases and the and the means of flow matching the two streams. This method may be extended to N gas streams.

Turning back to FIGS. 2 and 4, a method of mixing N gases and flow matching is presented. Where N is 3 or more. In one embodiment of this invention, the method includes N gas flow meters 103, 105, 114, 116, a pressure sensor 124, and a mixture composition control 120, which allows a mixed gas flow to be formed at a predetermined composition $C_1$. In the following, a system with 4 flow meters is discussed, however there need not be an even number of flow meters. The logic and method may be applied to any number of flow meters.

Each gas flow 104, 106, 107, 115 enters an associated gas flow meter 103, 105, 114, 116, and a desired gas flow rate $F_N$ is determined by the mixture composition control 120. The N gas streams 129, 130, 131, 132 are mixed, thereby producing a mixed gas flow 108 at the predetermined composition $C_1$ and at a line pressure $P_L$, with a total gas flow $F_T$. The total gas flow $F_T$ may be less than 8000 scfh.

The pressure sensor 124 provides a pressure signal 125 to the mixture composition control 120, which adjusts the flow commands to the flow meters as necessary to maintain a predetermined line pressure $P_L$. Simultaneously, the mixture composition control 120 provides a signal 134, 135, 136, 137 to each of the first gas flow meters, allowing the flow meters to adjust as necessary to maintain the predetermined composition $C_1$.

Turning back to FIGS. 1 and 3, a method of mixing two gases with a control trim feature is presented. In one embodiment of this invention, the method includes a first gas flow meter 103, a second gas flow meter 105, and a mixture composition control 120. The mixture composition control 120 comprises a predetermined composition input control and a composition trim input (manual set point trim control) 123, which allows a mixed gas flow to be formed at a predetermined composition $C_1$ with fine tuning (trim) adjustments as needed.

A first gas flow 104 enters the first gas flow meter 103, and a first desired gas flow rate $F_1$ is determined by the mixture composition control 120. A second gas flow 106 enters the second gas flow meter 105, and a second desired gas flow rate $F_2$ is determined by the mixture composition control 120. The first gas 129 and the second gas 130 are mixed, thereby producing a mixed gas flow 108 at the predetermined composition $C_1$. The composition trim input may be used to vary the actual composition of the mixed gas, without modifying the predetermined composition input.

The above described, non-limiting embodiments of the present invention describe the mixing of two gases and the and the means of flow matching the two streams. This method may be extended to N gas streams.

Turning back to FIGS. 2 and 4, a method of mixing N gases and flow matching is presented. Where N is 3 or more. In one embodiment of this invention, the method includes N gas flow meters 103, 105, 114, 116, and a mixture composition control 120. The mixture composition control 120 comprises a predetermined composition input control and a composition trim input (manual set point trim control) 123, which allows a mixed gas flow to be formed at a predetermined composition $C_1$ with fine tuning (trim) adjustments as needed.

Each gas flow 104, 106, 107, 115 enters an associated gas flow meter 103, 105, 114, 116, and a desired gas flow rate $F_N$ is determined by the mixture composition control 120. The N gas streams 129, 130, 131, 132 are mixed, thereby producing a mixed gas flow 108 at the predetermined composition $C_1$, with a total gas flow $F_T$. The total gas flow $F_T$ may be less than 8000 scfh. The composition trim input may be used to vary the actual composition of the mixed gas, without modifying the predetermined composition input.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of mixing between 2 and 4 gases, comprising:
    providing a mixture composition control, comprising a predetermined composition input and a composition trim input,
    providing N gas flow meters, comprising a N gas streams, and N desired gas flow rates determined by the mixture composition control, wherein N is between 2 and 4,
    mixing the N gas streams, thereby producing a mixed gas stream at the predetermined composition and at a line pressure,
    adjusting the N flow meters to adjust the N gas streams to maintain the line pressure at a predetermined value, while maintaining the predetermined composition,
    adjusting the composition trim input to vary the composition of the mixed gas stream, without modifying the predetermined composition input.

2. The method of claim 1, wherein one or more of the N gas streams, and/or the mixed gas outlet comprises a gas used in food processing, Modified Atmospheric Packaging, welding, industrial inerting, blanketing, or beverage production.

* * * * *